US008983922B2

(12) United States Patent
Parr et al.

(10) Patent No.: US 8,983,922 B2
(45) Date of Patent: Mar. 17, 2015

(54) MANAGEMENT OF PERSISTENCE IN A DATA PROCESSING SYSTEM

(75) Inventors: Francis Nicholas Parr, New York, NY (US); Andrew John Schofield, Chandlers Ford (GB); Stephen James Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1187 days.

(21) Appl. No.: 11/260,857

(22) Filed: Oct. 27, 2005

(65) Prior Publication Data

US 2006/0101089 A1 May 11, 2006

(30) Foreign Application Priority Data

Nov. 5, 2004 (GB) .................................. 0424490.1

(51) Int. Cl.
G06F 17/30 (2006.01)
(52) U.S. Cl.
CPC .................................. *G06F 17/30286* (2013.01)
USPC .......................................................... 707/705
(58) Field of Classification Search
USPC ....................... 707/200, 1, 202, 204, 694, 687
See application file for complete search history.

(56) References Cited

U.S. PATENT DOCUMENTS

| | | | | |
|---|---|---|---|---|
| 6,577,597 B1* | 6/2003 | Natarajan et al. | ............. | 370/232 |
| 6,671,705 B1* | 12/2003 | Duprey et al. | ................ | 707/204 |
| 7,146,387 B1* | 12/2006 | Russo et al. | ........................... | 1/1 |
| 7,149,787 B1* | 12/2006 | Mutalik et al. | ................ | 709/217 |
| 7,152,184 B2* | 12/2006 | Maeda et al. | ..................... | 714/6 |
| 7,213,068 B1* | 5/2007 | Kohli et al. | ................... | 709/225 |
| 7,290,017 B1* | 10/2007 | Wang et al. | .................... | 707/204 |
| 7,299,478 B2* | 11/2007 | Bagsby | ........................ | 719/315 |
| 7,353,533 B2* | 4/2008 | Wright et al. | ..................... | 726/1 |
| 7,610,575 B2* | 10/2009 | Sproule | ........................ | 717/103 |
| 8,266,438 B2* | 9/2012 | Orsini et al. | .................... | 713/176 |
| 2001/0047412 A1* | 11/2001 | Weinman, Jr. | ................ | 709/225 |
| 2001/0056438 A1* | 12/2001 | Ito | ................ | 707/204 |
| 2004/0044539 A1* | 3/2004 | Taricco et al. | .................... | 705/1 |
| 2004/0107125 A1* | 6/2004 | Guheen et al. | .................... | 705/7 |
| 2004/0225659 A1* | 11/2004 | O'Brien et al. | ................... | 707/9 |
| 2005/0195660 A1* | 9/2005 | Kavuri et al. | ............ | 365/189.05 |

OTHER PUBLICATIONS

State-Based Security Policy Enforcement in Component-Based E-Commerce Applications. P Herrmann, L Wiebusch, H Krumm—Proceedings of the 2nd IFIP Conference on E-Commerce, 2002.*
"Asynchronous Commit," www.ip.com00031629D.
"SuperSpeed," www.raxco.be/pages/info/SuperSpeed-Cache/supercache.htm.

(Continued)

*Primary Examiner* — Noosha Arjomandi
(74) *Attorney, Agent, or Firm* — Steven M. Greenberg, Esq.; CRGO Law

(57) ABSTRACT

A user is enabled to specify policy information for use by a persistence manager in determining how to persist information relating to a data item so as achieve a desired level of reliability. The user is permitted to specify at least two behavior requirements to be associated with information to be persisted. The first behavior requirement is specifiable for a first system state, and the second behavior state is specifiable for a second system state. The behavior requirements are interpretable by the persistence manager to determine a persistence behavior necessary to conform with the policy information.

12 Claims, 6 Drawing Sheets

(56) References Cited

OTHER PUBLICATIONS

Webber, Jim, ""Future Directions for Web Transactions"," HP Presentation.

"Oasis, Business Transaction Protocol, " version 1.0.0.4, BTP 1.1 Working Draft 04 Oct. 26, 2004.
"PTF Memo for : IBM WebSphere MQ for AIX Version 5.3 Service Level 5.3.0.9 (Fix Pack CSD09)," International Business Machines Corporation, 1995, 2004.

* cited by examiner

PERSISTENCE MANAGER 55

| DELIVERY REQUIREMENT | NORMAL RUNNING 305 | CONTROLLED SHUTDOWN 310 | FAILURE 300 |
|---|---|---|---|
| EXACTLY ONCE | NO STRICT PERSISTENCE REQUIREMENT | MUST RECORD COMMITTED PUT AND GET BEFORE SHUTDOWN | MUST RECORD COMMITTED PUT & GET SYNCHRONOUSLY |
| AT MOST ONCE | NO STRICT PERSISTENCE REQUIREMENT | MUST RECORD COMMITTED GET BEFORE SHUTDOWN | MUST RECORD COMMITTED GET SYNCHRONOUSLY (320) |
| AT LEAST ONCE | NO STRICT PERSISTENCE REQUIREMENT | MUST RECORD COMMITTED PUT BEFORE SHUTDOWN | MUST RECORD COMMITTED PUT SYNCHRONOUSLY |
| DON'T CARE | NO STRICT PERSISTENCE REQUIREMENT | NO STRICT PERSISTENCE REQUIREMENT | NO STRICT PERSISTENCE REQUIREMENT |

| POLICY | NORMAL RUNNING | CONTROLLED SHUTDOWN | FAILURE | PERSISTENCE BEHAVIOR | 68 |
|---|---|---|---|---|---|
| ASSURED | EXACTLY ONCE | EXACTLY ONCE | EXACTLY ONCE | MUST RECORD COMMITTED PUT AND GET SYNCHRONOUSLY | |
| RELIABLE | EXACTLY ONCE | EXACTLY ONCE | AT MOST ONCE | MUST RECORD COMMITTED GET SYNCHRONOUSLY, MUST RECORD COMMITTED PUT BEFORE SHUTDOWN | 69 |
| UNRELIABLE | EXACTLY ONCE | AT MOST ONCE | AT MOST ONCE | MUST RECORD COMMITTED GET SYNCHRONOUSLY | |

MANAGEMENT OF PERSISTENCE IN A DATA PROCESSING SYSTEM

FIELD OF THE INVENTION

The present invention relates to transactional systems such as messaging or database systems, and more particularly to transactional systems which persist data in order to guarantee data integrity in, for example, the event of a system failure.

BACKGROUND OF THE INVENTION

A transactional system typically persists data to persistent storage such as a log.

FIG. 1 illustrates such a system, here a messaging system, in accordance with the prior art. A four layered approach is shown. An application 10 residing at layer 1 issues a request, such as a PUT message or a GET message request, through application interface (I/F) 20, to messaging processor 30 at layer 2. Messaging processor 30 then performs an operation in accordance with the application's request. For example, the message processor PUTS a message to queue 40. The message processor also persists the requested operation by issuing a persist request through persistence interface 50 to persistence manager 55 at layer 3. Thus operations on messages (op1 to op7) are held by the persistence manager at layer 3. For a messaging system such operations are likely to include PUTS and GETS, but for a database system such operations may include update, insert and delete requests.

Each operation will, at some point in time, be written by the persistence manager 55 through the storage interface 60 to persistent store (e.g. log) 70 at layer 4. When a commit associated with a set of operations (a transaction) is finally confirmed as having been forced to the persistent store, all operations comprising the transaction are also in persistent storage and the system can guarantee to the application that it is possible to recover that set of operations in the event of a system failure. In other words, whilst the persistence manager is permitted a degree of flexibility about hardening the persistence records describing the operations comprising a transaction, all such operations must be on disk by the time the commit is hardened. At this point, the system returns control to the application 10 and processing can continue. Note, as shown in FIG. 1, transactions may be identified by a transaction id (tid1 to 3).

Forcing data to persistent storage is however an expensive process, in terms of time and processing power.

The idea of an asynchronous commit is therefore known; see, for example, the www site IP.com000031629D. This means that as far as an application is concerned, its request has happened, but in reality the system may force or persist appropriate data to disk at a later time.

IDE disks, for example, provide an option such that under certain circumstances if asked to force data to storage, such forcing is not immediately but is done asynchronously.

The www site raxco.be/pages/info/SuperSpeed-Cache/supercache.htm discloses a lazy write system in which a write flush is performed once every second. This is used to improve performance for write intensive applications.

Asynchronous forcing can however result in consistency problems. If the system fails prior to a force, it is not then possible to be sure of the state of the persistent storage.

In the messaging world it is also possible for the requirements for forcing data to persistent storage to be relaxed. For example a message may be designated as "semi-persistent". This means that upon controlled shutdown, the system guarantees not too lose data but does not make the same guarantees upon system failure.

All of the above solutions are however predefined by the disk or middleware designer. Customers are not provided with any flexibility. There may be certain circumstances under which a customer is prepared to accept a particular degree of risk which is appropriate to the kind of environment that they are operating in; e.g., reliability may be sacrificed for speed.

SUMMARY OF THE INVENTION

According to a first aspect, the invention provides a method for a data processing system comprising: enabling a user to specify policy information for use by a persistence manager in determining how to persist information relating to a data item so as achieve a desired level of reliability, the enabling step comprising: permitting the user to specify at least two behavior requirements to be associated with information to be persisted, a first behavior requirement being specifiable for a first system state and a second behavior state being specifiable for a second system state, the behavior requirements being interpretable by the persistence manager to determine a persistence behavior necessary to conform with the policy information.

In a preferred embodiment, a user is permitted to specify one or more behavior requirements to be associated with information to be persisted.

Preferably at least one behavior requirement is that transactional integrity should be maintained for a set of operations on one or more data items having such a behavior requirement associated therewith.

In one embodiment the data processing system is a messaging system and the information relating to a data item is a message. In this embodiment it is possible for a user to specify delivery requirements for a message dependent upon a system operational state—e.g. "at most once" message delivery whilst the system is at state A and "exactly once" delivery whilst the system is at state B. Operational states may be, by way of example, normal running; controlled shutdown; system failure; system chosen checkpoint; administrator chosen checkpoint.

Preferably a user is able to specify the interaction between two types of policy information, both being applicable to the same information.

According to a second aspect, there is provided a method for a persistence manager to persist data comprising: receiving a request to persist information relating to a data item; reading policy information in order to determine how to persist the information so as achieve a desired level of reliability, the policy information specifying a first behavior requirement specifiable for a first system state and a second behavior requirement specifiable for a second system state, interpreting behavior requirements in order to determine a persistence behavior necessary to conform with the policy information read; persisting the information relating to the data item accordingly.

Preferably it is possible to determine that more than one type of policy information is applicable to the data item to be persisted, in which case differences are preferably resolved to determine what persistence behavior is appropriate.

According to a third aspect, there is provided apparatus for a data processing system comprising: an enabling component for enabling a user to specify policy information for use by a persistence manager in determining how to persist information relating to a data item so as achieve a desired level of reliability, the enabling component comprising: a first permitting component for permitting the user to specify at least two behavior requirements to be associated with information to be persisted, a first behavior requirement being specifiable for a first system state and a second behavior state being specifiable for a second system state, the behavior requirements being interpretable by the persistence manager to determine a persistence behavior necessary to conform with the policy information.

According to a fourth aspect, there is provided apparatus for a persistence manager to persist data comprising: a receiving component for receiving a request to persist information relating to a data item; a reading component for reading policy information in order to determine how to persist the information so as achieve a desired level of reliability, the policy information specifying a first behavior requirement specifiable for a first system state and a second behavior requirement specifiable for a second system state, an interpreting component for interpreting behavior requirements in order to determine a persistence behavior necessary to conform with the policy information read; a persisting component for persisting the information relating to the data item accordingly.

The invention may be implemented in computer software.

BRIEF DESCRIPTION OF THE DRAWINGS

A preferred embodiment of the present invention will now be described, by way of example only, and with reference to the following drawings, wherein:

FIG. 5 illustrates the persistence manager in accordance with a preferred embodiment of the present invention.

Figure 1:
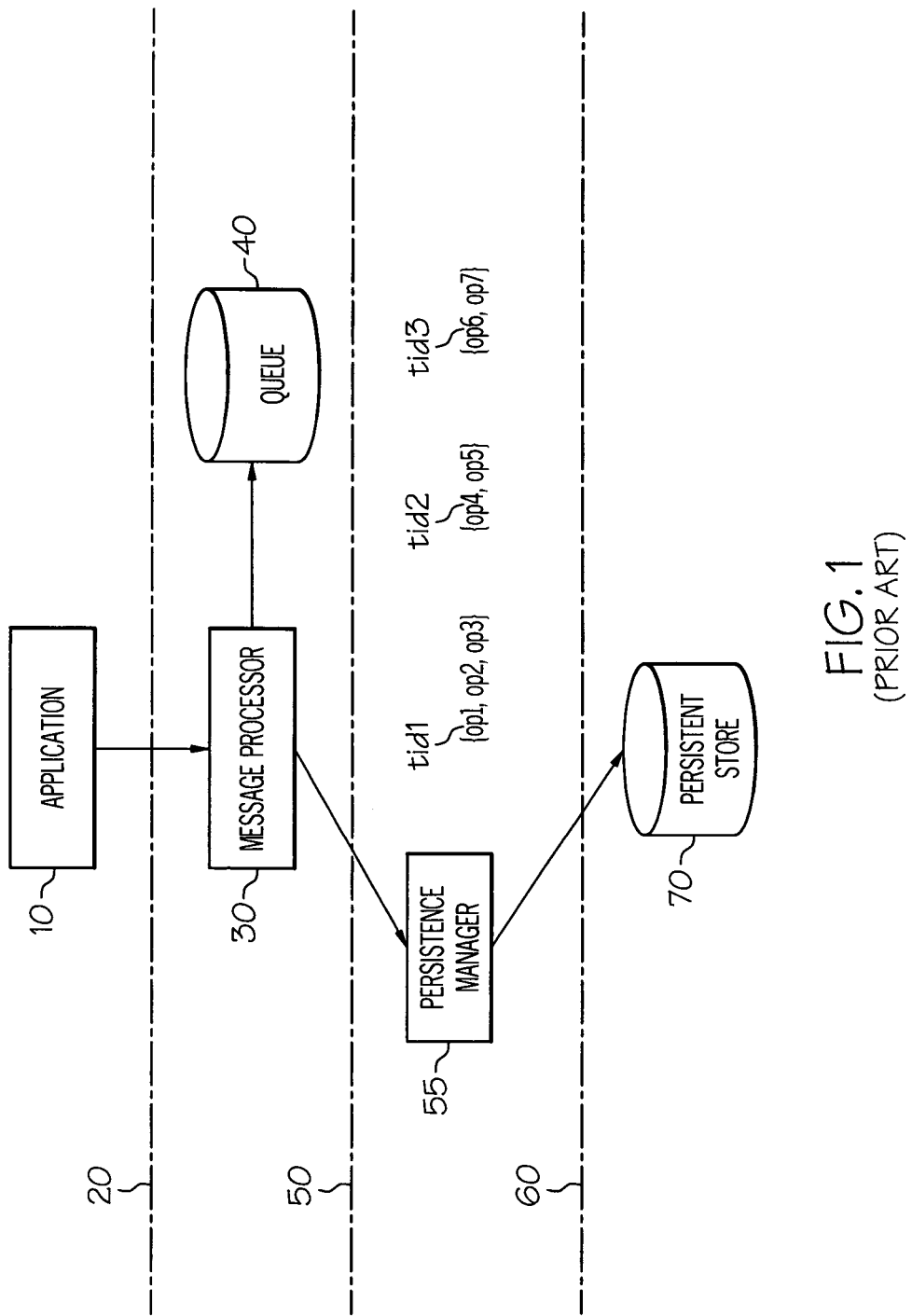
FIG. 1 shows a messaging system in accordance with the prior art.

Throughout the figures, like components will be identically numbered.

DETAILED DESCRIPTION

Due to the frequently significant cost of interaction by a transactional data processing system with a persistent store, it is not always possible to achieve adequate performance by synchronous use of such a store. This is true in, for example, a system in which new data items are short-lived and the throughput is high, such as a messaging system. In such an environment it may be acceptable to trade some transactionality for increased performance. There is a risk that entire (but not partial) transactions may be lost in the case of failures. Nevertheless, depending on the type of data being processed by the system, this is a risk that a user may be willing to accept in order to improve the throughput of the system.

In accordance with a preferred embodiment, it is now possible for a user (customer) to define the behavior that is acceptable under adverse conditions; i.e., well-defined "bad" behavior in the light of failures, system shutdowns, and the like.

In messaging and other transactional systems today, customers can request various qualities of service, including various levels of persistence and reliability. For example, IBM's WebSphere® MQ gives some per message control so that persistent messages will not be lost, but non-persistent ones may be, and transaction control so that all operations within a transaction will atomically succeed or fail. The meaning of such qualities of service is however pre-defined.

Best transactional delivery even in the event of failure causes inherently high runtime expense.

The emphasis is typically on the provision of ever greater reliability. However, there are also more low value 'microtransactions' being processed. System users might well, given the option, therefore choose to take a calculated risk of 'incorrect' answers in failure and certain other cases.

Thus in accordance with the preferred embodiment, a user is permitted to define various levels of reliability in the event of operational states such as:

(i) standard ("normal") runtime behavior
(ii) controlled shutdown; and
(iii) system failure.

Note that the operational states listed above are exemplary only.

Other operational states could also be defined such as "immediate shutdown". In certain circumstances operational states may inherit properties from other operational states. For example, "immediate shutdown" may be seen to have the same effect as "system failure".

Other operations states may be:

(i) a system chosen checkpoint;
(ii) an administrator chosen checkpoint.

Thus the user is provided with a reasonable degree of flexibility.

Another example of state is a time click at regular time intervals, where there is calculated risk of failure between an operation and the next time click. This can happen with lazy writing being flushed at regular intervals (time clicks). Please see the http www site raxco.be/pages/info/SuperSpeedCache/supercache.htm. Note that the prior art assures that the system is in a specified state if failure happens after that flush following an operation, but does not indicate that a user may specify and control the state for failure before that flush.

Figure 2:
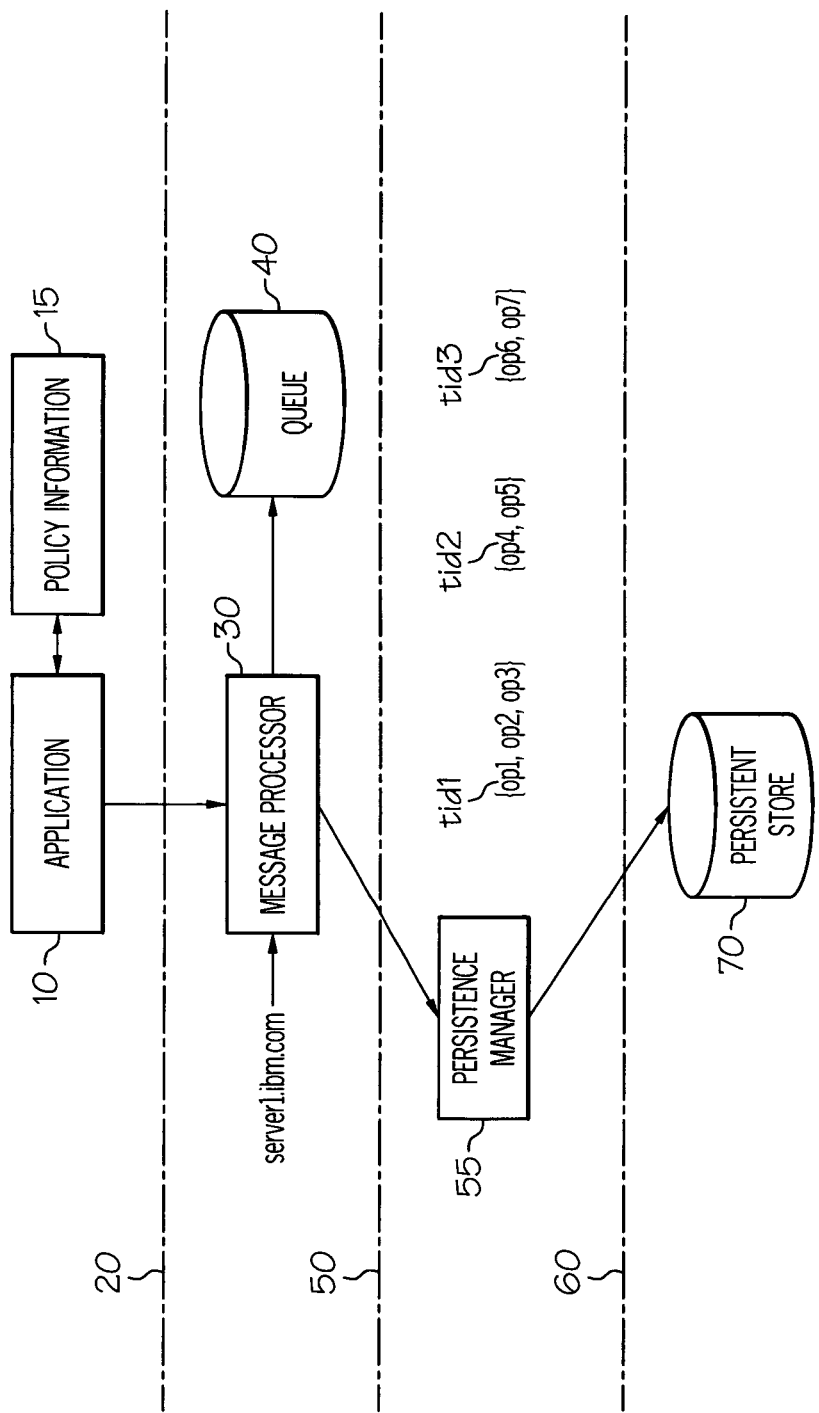
FIG. 2 illustrates a messaging system in accordance with a preferred embodiment of the present invention.

FIG. 2 illustrates a messaging system in accordance with a preferred embodiment of the present invention. The invention is however applicable to any transactional system. It will be appreciated that this figure is similar to FIG. 1. Thus only the new components will be described in detail.

Application 10 has the ability to associate policy information 15 with a message; message type; or transaction and this policy information is then used by the system to determine how the system persists requests from the application which relate to a particular message. Such policy information is preferably defined at layer three by a system administrator during system setup. Such defined policies are then preferably exposed to higher layers (e.g., layer 1) for their use. As alluded to above, a policy may, for example, refer to a particular message; to a message type; or to a particular transaction. A policy may also be associated with a queue. Thus information defined at level 3 is also preferably exposed at layer 2.

Figure 3:
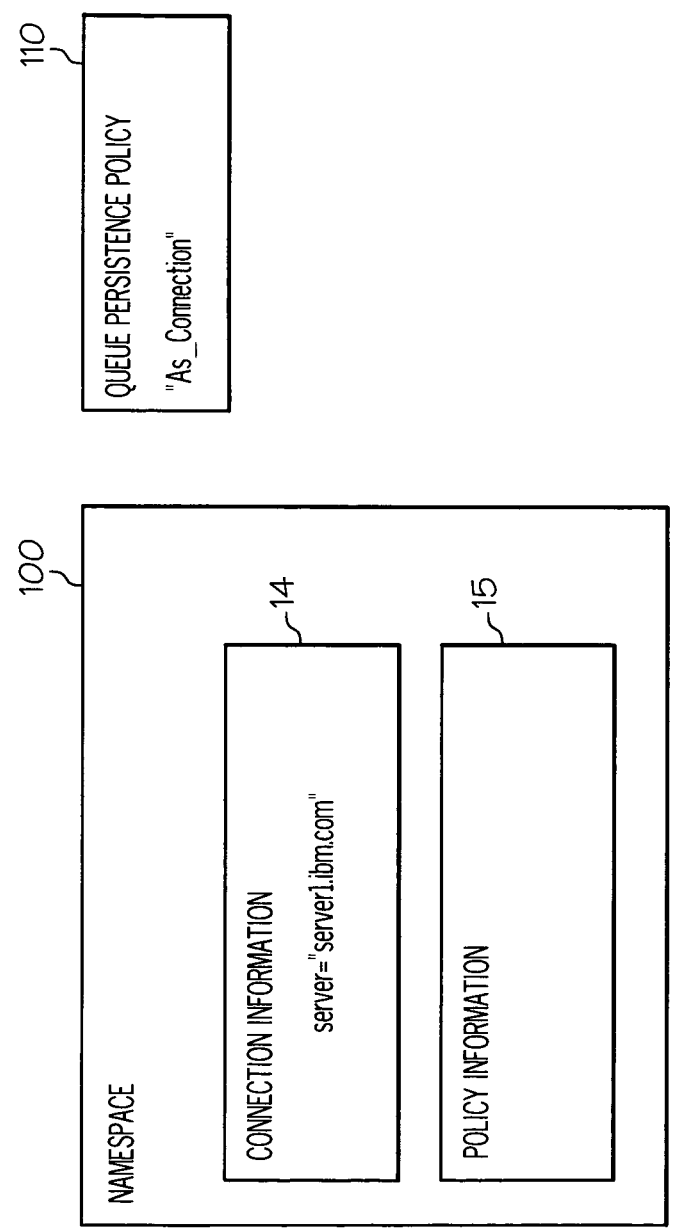
FIG. 3 shows connection and policy information used in accordance with a preferred embodiment of the present invention.

FIG. 3 shows that connection information 14 such as a queue connection factory in Java™ (Java and all Java-based trademarks are trademarks of Sun Microsystems Inc in the United States, other countries, or both) messaging service (JMS) terms sits within a namespace 100. Application 10 uses the connection information to determine which server or message processor 30 the application should connect to. In the depicted example, the allocated server is "server1.ibm.com" message processor 30.

Figure 4:
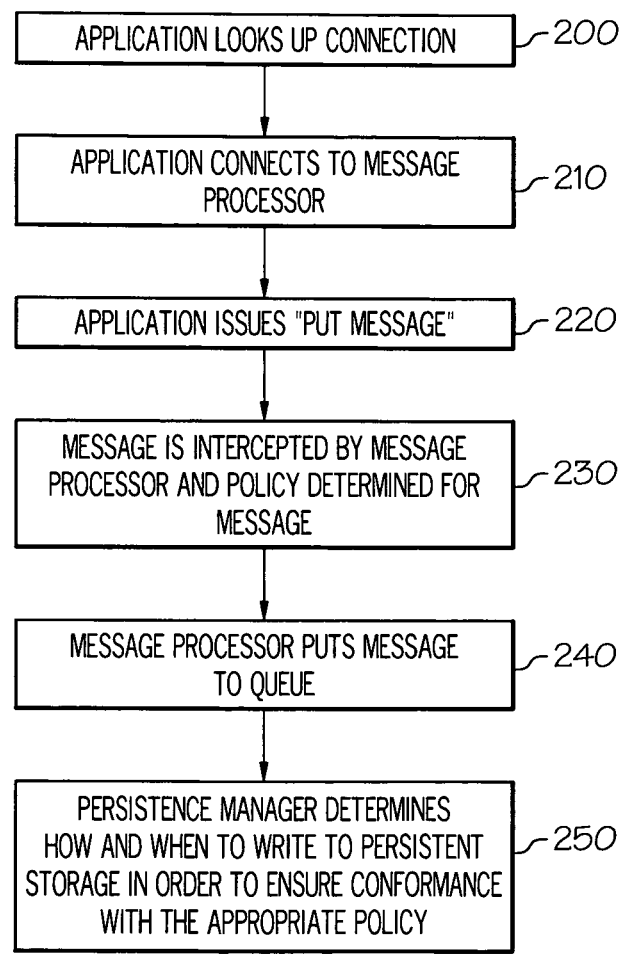
FIG. 4 is a flow chart of the processing of the present invention in accordance with a preferred embodiment.

FIG. 4 is a flow chart of the processing of the present invention in accordance with a preferred embodiment. Thus, at step 200 application 10 looks up its connection to an appropriate message processor and then connects to that message processor at step 210. At step 220, application 10 issues a request such as to PUT a message to a queue 40 associated with the message processor.

The request is received by the message processor and a policy for the message being PUT is determined (step 230). The policy may be based on policy information obtained from policy information 15 at the same time as step 200. FIG. 3 also illustrates that the namespace contains policy information 15 as discussed with reference to FIG. 2.

If a policy is obtained from policy information 15, information regarding the policy is preferably transmitted with the message.

Thus when the message is received at step 230, an appropriate processing policy can be retrieved from the request itself.

As briefly mentioned above however, policy information may also be associated with a particular queue. Such policy information is preferably specified by the queue's administrator at queue definition time. FIG. 3 also shows a sample queue persistence policy 110. The policy shown in the figure is "As_Connection" which indicates that the policy defined by policy information 15 should be used. However, it is possible for a queue's administrator to specify an overriding policy. For example, an administrator may decide that a particular persistence policy is appropriate irrespective of the policy specified at layer 1. This decision could be based on the queue administrator's knowledge of the purpose of the queue in question.

Alternatively, policy information could be derived from the message being put by application of a business rule. For example, a business rule which increases the level of persistence for messages of higher monetary value. A pointer to such business rule information is preferably held in layer 2 (see FIG. 2) but is defined at layer 3.

Once the message processor 30 has determined the policy (the persistence policy) that will be applied to the message, that message is put to queue 40 with an indication of the policy that should be applied by a persistence manager 55 at layer 3, as illustrated at step 240 of FIG. 4.

At step 250, persistence manager 55 determines how and when to write to persistent storage in order to ensure conformance with the appropriate policy.

FIG. 5 shows the persistence manager in more detail. The persistence manager preferably has knowledge of possible delivery requirements (policy choices) for a message or transaction (e.g. "exactly once", "at most once", "at least once", "don't care") and knows what is necessary to achieve such requirements in terms of persistence behavior. Such knowledge is represented in FIG. 5 by table 300. Thus in order to ensure that a message is delivered "exactly once", any committed PUTs and GETs must be recorded prior to shutdown to cover the controlled shutdown situation. However, in order to ensure that a system failure does not cause a message not to be delivered or to be delivered more than once, committed PUTs and GETs must be recorded synchronously relative to the application's requests. Thus persistence behavior necessary to achieve a particular delivery requirement may vary dependent upon the system's operational state. Further a user may wish to specify a different delivery requirement for each possible operational state. For example:

| | |
|---|---|
| Normal Running | –> Exactly Once |
| Controlled Shutdown | –> Exactly Once |
| Failure | –> At most Once |

Thus the persistence manager permits an administrator to define different delivery requirements for each of the possible operational states. The persistence manager then uses the knowledge held in table 300 to determine the overall least strict behavior required to achieve the delivery requirement specified for each operational state.

To take the example, above: Normal Running requires that the message is delivered "exactly once". From table 300, it is determined that there is no strict persistence requirement necessary in order to achieve "exactly once" delivery during "normal running" (see entry 305). To achieve "exactly once" delivery upon "controlled shutdown", it is necessary to record committed PUTs and GETs prior to shutdown (see entry 310). Finally, to achieve "at most once" delivery should the system "fail", it is necessary to record any committed GETs synchronously (entry 320). Thus in order achieve all of above delivery requirements, it is necessary to record committed GETs synchronously, and to record committed PUTs prior to shutdown.

Note, by way of another example, the user may specify additional operational states:

| | |
|---|---|
| Failure after time click | –> Exactly Once |
| Failure before time click | –> At Most Once |

To achieve this, it is necessary to record message PUTs prior to given time click but GETs must be forced immediately.

Thus as indicated above, policy information 15 and queue policy information 110 may refer to the individual operational states and desired delivery requirements for each of those states. However, in order to simplify things, the administrator is able to specify policy names, thus creating actual policies, and to associate these with sets of delivery requirements. Policies are defined by the administrator at layer 3 but exposed by the system for use at layer 1 and/or 2.

In the preferred embodiment, three policies are defined by the user (i.e., the administrator or customer programmer, rather than the middleware or system designer) for:

(i) Assured;
(ii) Reliable; and
(iii) Unreliable

The definition of each policy is received and held in table 68 of FIG. 5. For each policy, the administrator is able to define a message delivery requirement for each of the three operational states of the system, which are normal running, controlled shutdown, and failure). Thus in order to guarantee "assured" delivery, a message must be delivered "exactly once" irrespective of the operational state. An administrator may, of course, create additional policies and fill in their details as required.

It should therefore now be apparent that the persistence manager uses the knowledge it holds in table 300 and the information entered by the administrator into table 68 regarding delivery requirements, to determine the appropriate persistence behavior for each policy (e.g., to complete the logging behavior column of table 68).

Such an approach provides for a very flexible system. The persistence behavior column may be generated in a generation step at system setup or may be determined dynamically at runtime. The former is a less processor intensive approach and is therefore preferable.

Figure 6:
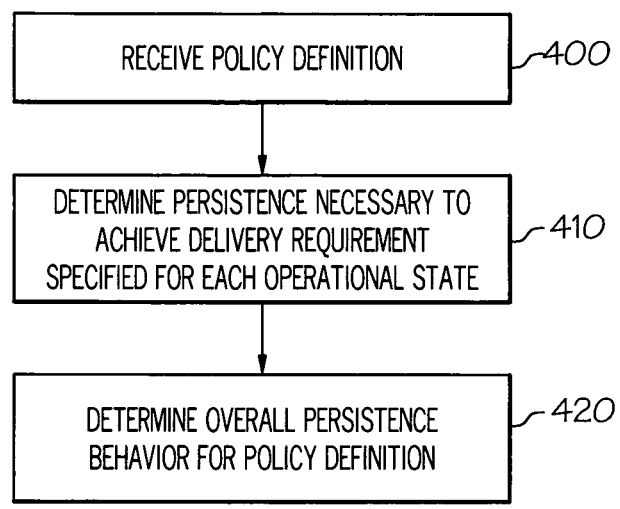
FIG. 6 illustrates the processing of the present invention in accordance with a preferred embodiment of the present invention.

FIG. 6 is a flow chart illustrating the processing performed by the persistence manager in accordance with a preferred embodiment of the present invention. At step 400 a policy definition is received, for example in row 1 ("assured") of table 68, excluding the persistence behavior entry. At step 410, table 300 is used to determine the persistence behavior for each operational state that is necessary to achieve the delivery requirement specified for each operational state during step 400 (in table 68). Finally at step 420, the result of step 410 is used to determine the overall persistence behavior appropriate for the policy during step 400.

Note, the delivery requirement options are preferably provided to the administrator as a list from which the appropriate choice may be selected and entered into table 68.

In another embodiment, the administrator is also provided with a list of operational states from which they may select. Table 300 holds information about the persistence behavior necessary to achieve the appropriate delivery requirement for each of the possible operational states. The administrator's selections are then used to build table 68.

Thus the system described above provides the administrator with a great deal of flexibility. However given the many delivery options for even a single situation, the option set within the system is likely to be huge. One way to manage this is for an administrator to choose certain collections deemed likely to be useful; to give these collections names; and to pre-define the required persistence behavior.

Note, in accordance with the preferred embodiment, each data item in the persistent store resolves to a reliability level (policy). This is provided as an attribute of the data item. Other attributes include a data item id and a name. When a message or data item is put or inserted into the persistent store for the first time, the reliability level is provided with the data item in accordance with defined policy information. When a data item is updated or deleted from the persistent store, then the reliability level is already associated with the data item as an attribute.

It may be in some circumstances that reliability policies are effectively changed as a result of the operation being performed on a data item, for example during update and delete.

It should also be appreciated that policies may be picked up for each message operation and some decisions made based on these independent operations, but that in other cases a global decision is made based on many separate policies and determinations. For example very strong transactional requirements associated with one operation may force higher persistence requirements on another operation than that operation would have had in isolation.

Note, the preferred embodiment has been described in terms of policy information. This could be taken to imply that it must be specified by a system administrator. However this is not the case. Instead such information could be defined in the application programming interface (API) by a customer programmer. What is important however is that the reliability levels and their meaning at each system operational state is not pre-defined. A customer is provided with the flexibility to specify their own meaning for each reliability level. In other words, the customer is able to specify how much of a risk he or she is willing to accept in different situations. Thus in this instance the use of the phrase "policy information" is intended to encompass information defined by an administrator or by a system programmer, but not by a middleware designer or programmer.

Note that although the specification has described three levels of reliability, which are assured, reliable and unreliable, other levels are, of course, possible. For example, a user such as an administrator or API programmer could specify that whatever happens, irrespective of how often persisting to storage occurs, transactionality must be maintained, meaning that a transaction either completes properly or it is rolled back. This is achieved by ensuring that where a set of operations are involved in a transaction, these are all forced before logging the operation COMMIT TRANSACTION. This is standard and natural behavior where operations are written in the order in which they are received. In this disclosure where operations may in general be reordered for efficiency, it is a limitation of degree of which the system may choose.

Please also note, that although the invention has been described in terms of messaging, the invention is equally applicable to other transactional systems, such as, for example, database systems.

We claim:

1. A method of persistence management in a data processing system, comprising:

defining in memory of a computer, a desired level of reliability specifying a degree of a risk by specifying policy information by an end user;

receiving a request for an operation on a data item from an application for carrying out a business transaction;

determining that more than one type of policy information is applicable to the data item to be persisted;

resolving any differences between the more than one type of applicable policy information;

determining a persistence policy of a persistence data store storing persisted data associated with the operation from the received request, the persistence policy being based upon pre-defined data entered by a user within the application and specifying how and when to store data in the persistence data store so as to achieve the desired level of reliability;

performing the requested operation; and persisting the performed operation to the persistence data store in conformance with the determined persistence policy.

2. The method of claim 1, wherein the persistence policy requires that transactional integrity should be maintained for a set of operations on at least one data item.

3. The method of claim 1, wherein the data processing system is a messaging system and the data item is a message.

4. The method of claim 1, wherein the persistence policy specifies delivery requirements by selecting from the group consisting of exactly once delivery and at most once and the persistence policy specifies system operational states by selecting from the group consisting of: normal running, controlled shutdown, system failure, system chosen checkpoint, and administrator chosen checkpoint.

5. Apparatus for persistence management in a data processing system, comprising:

a processor for receiving a request for an operation on a data item from an application for carrying out a business transaction and performing the requested operation;

a persistence data store;

a persistence manager for defining a desired level of reliability specifying a degree of a risk by specifying policy information by an end user, determining that more than one type of policy information is applicable to the data item to be persisted, resolving any differences between the more than one type of applicable policy information, determining a persistence policy of the persistence data store storing persisted data associated with the operation from the received request and for persisting the performed operation to the persistence data store in conformance with the determined persistence policy, the persistence policy being based upon pre-defined data entered by a user within the application and specifying how and when to store data in the persistence data store so as to achieve the desired level of reliability.

6. The apparatus of claim 5, wherein the persistence policy requires that transactional integrity should be maintained for a set of operations on at least one data item.

7. The apparatus of claim 5, wherein the data processing system is a messaging system and the data item is a message.

8. The apparatus of claim 5, wherein the persistence policy specifies delivery requirements by selecting from the group consisting of exactly once delivery and at most once and the persistence policy specifies system operational states by selecting from the group consisting of: normal running, controlled shutdown, system failure, system chosen checkpoint, and administrator chosen checkpoint.

9. A computer program product comprising a non-transitory computer readable storage medium having computer readable program code embedded therein, the computer readable program code, when executed by a machine, causes the machine to perform the steps comprising:
 defining a desired level of reliability specifying a degree of a risk by specifying policy information by an end user;
 receiving a request for an operation on a data item from an application for carrying out a business transaction;
 determining that more than one type of policy information is applicable to the data item to be persisted;
 resolving any differences between the more than one type of applicable policy information;
 determining a persistence policy of a persistence data store storing persisted data associated with the operation from the received request, the persistence policy being based upon pre-defined data entered by a user within the application and specifying how and when to store data in the persistence data store so as to achieve the desired level of reliability;
 performing the requested operation; and
 persisting the performed operation to the persistence data store in conformance with the determined persistence policy.

10. The computer program product of claim 9, wherein the persistence policy requires that transactional integrity should be maintained for a set of operations on at least one data item.

11. The computer program product of claim 9, wherein the data processing system is a messaging system and the data item is a message.

12. The computer program product of claim 9, wherein the corresponding delivery requirements for each of the one or more system operational states is selected from the group consisting of exactly once delivery and at most once and each of the one or more system operational states is selected from the group consisting of: normal running, controlled shutdown, system failure, system chosen checkpoint, and administrator chosen checkpoint.

\* \* \* \* \*